(12) United States Patent
Shor et al.

(10) Patent No.: US 7,539,271 B2
(45) Date of Patent: May 26, 2009

(54) SYSTEM AND METHOD FOR MULTI-BAND ULTRA-WIDE BAND SIGNAL GENERATORS

(75) Inventors: Gadi Shor, Tel-Aviv (IL); David Yaish, Tel-Aviv (IL); Yaron Knobel, Givat-Shmuel (IL); David Meshulam, Hod-Hasharon (IL); Zeev Rubin, Alphei-Mcnashe (IL); Benny Blumer, Kfar-Saba (IL)

(73) Assignee: Wisair Ltd., Tel-Aviv (IL)

( * ) Notice: Subject to any disclaimer, the term of this patent is extended or adjusted under 35 U.S.C. 154(b) by 949 days.

(21) Appl. No.: 10/643,108

(22) Filed: Aug. 18, 2003

(65) Prior Publication Data
US 2004/0131130 A1 Jul. 8, 2004

Related U.S. Application Data

(63) Continuation-in-part of application No. 10/389,789, filed on Mar. 17, 2003.

(60) Provisional application No. 60/450,737, filed on Feb. 28, 2003, provisional application No. 60/404,070, filed on Aug. 16, 2002.

(51) Int. Cl.
*H04L 27/20* (2006.01)
*H04L 27/22* (2006.01)

(52) U.S. Cl. .................... 375/308; 375/329

(58) Field of Classification Search ........... 375/130, 375/132, 138, 239, 308, 329; 341/177, 178, 341/180–182
See application file for complete search history.

(56) References Cited

U.S. PATENT DOCUMENTS

| | | | |
|---|---|---|---|
| 5,177,767 A | 1/1993 | Kato | |
| 5,206,881 A | 4/1993 | Messenger et al. | |
| 5,218,620 A | 6/1993 | Mori et al. | |
| 5,323,419 A | 6/1994 | Mori et al. | |
| 5,347,537 A | 9/1994 | Mori et al. | |
| 5,583,915 A * | 12/1996 | Ishida ..................... | 455/412.1 |
| 5,598,405 A * | 1/1997 | Hirose ...................... | 375/375 |
| 5,677,927 A | 10/1997 | Fullerton et al. | |
| 5,960,031 A | 9/1999 | Fullerton et al. | |
| 5,963,581 A | 10/1999 | Fullerton et al. | |
| 5,995,534 A | 11/1999 | Fullerton et al. | |
| 6,002,707 A | 12/1999 | Thue | |
| 6,026,125 A | 2/2000 | Larrick, Jr. et al. | |
| 6,031,862 A | 2/2000 | Fullerton et al. | |
| 6,075,807 A | 6/2000 | Warren et al. | |
| 6,351,652 B1 | 2/2002 | Finn et al. | |
| 6,430,208 B1 * | 8/2002 | Fullerton et al. ........... | 375/130 |
| 6,535,073 B1 * | 3/2003 | Garg et al. ................. | 375/295 |

(Continued)

FOREIGN PATENT DOCUMENTS

EP 0889 600AS 1/1999

(Continued)

*Primary Examiner*—Khai Tran
(74) *Attorney, Agent, or Firm*—Pearl Cohen Zedek Latzer, LLP

(57) ABSTRACT

The present invention provides systems and methods relating to ultra-wide band communications. A method is provided for transmitting information using ultra-wide band transmission. The method includes allocating, for signal transmission, each of a plurality of frequency sub-bands. The method further includes sending an ultra-wide band transmission comprising the information by transmitting a burst symbol cycle signal over each of the plurality of frequency sub-bands.

10 Claims, 19 Drawing Sheets

U.S. PATENT DOCUMENTS

| | | | |
|---|---|---|---|
| 6,665,339 B1 * | 12/2003 | Adams et al. | 375/238 |
| 6,690,741 B1 * | 2/2004 | Larrick et al. | 375/295 |
| 6,763,057 B1 * | 7/2004 | Fullerton et al. | 375/141 |
| 6,888,887 B1 * | 5/2005 | Shattil | 375/239 |
| 6,952,456 B1 * | 10/2005 | Aiello et al. | 375/295 |

FOREIGN PATENT DOCUMENTS

| | | |
|---|---|---|
| JP | 2-137533 | 5/1990 |
| JP | 11-27180 | 1/1999 |
| JP | 11-284599 | 10/1999 |
| JP | 11-313005 | 11/1999 |
| WO | WO01/11814 A1 | 2/2001 |
| WO | WO01/39451 A1 | 5/2001 |
| WO | WO01/93441 A1 | 12/2001 |
| WO | WO01/99300 A2 | 12/2001 |

* cited by examiner

| Carrier A | 1A | 2A | 3A | 4A | 1A | 2A | 3A | 4A | 1A | 2A | 3A | 4A |
|---|---|---|---|---|---|---|---|---|---|---|---|---|
| Carrier B | 1B | 2B | 3B | 4B | 1B | 2B | 3B | 4B | 1B | 2B | 3B | 4B |
| Carrier C | 1C | 2C | 3C | 4C | 1C | 2C | 3C | 4C | 1C | 2C | 3C | 4C |
| Multi Carrier | 1A | 2B | 3C | 4A | 1B | 2C | 3A | 4B | 1C | 2A | 3B | 4C |

Figure 4

Fig. 7A
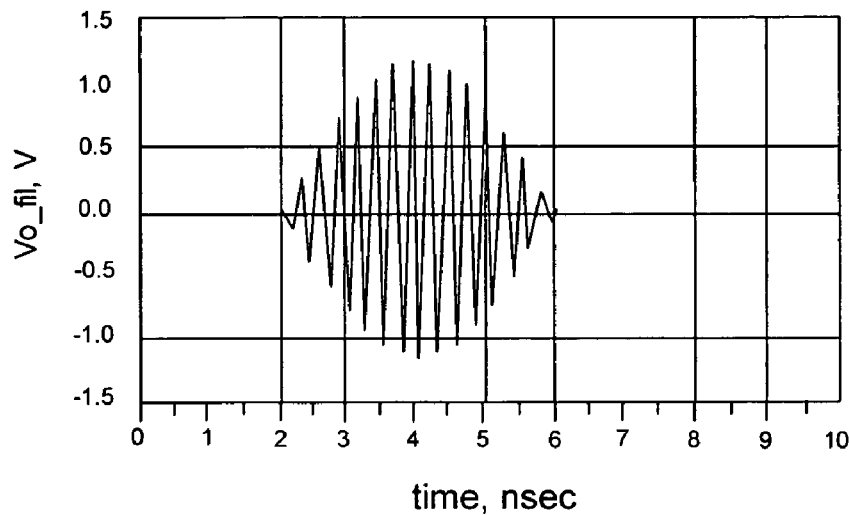
| m4 | m5 | m6 |
|---|---|---|
| freq=3.766GHz | freq=3.500GHz | freq=4.016GHz |
| dbm(fs(Vo))=-36.620 | dbm(fs(Vo))=-46.125 | dbm(fs(Vo))=-46.125 |
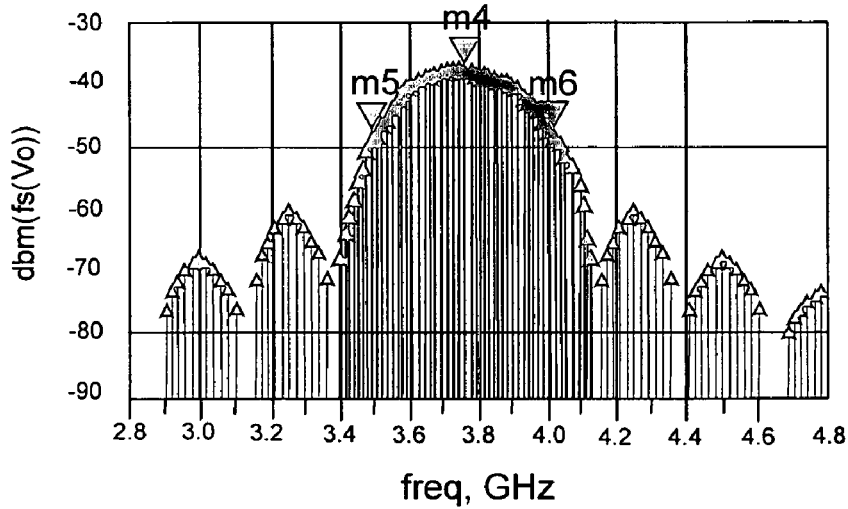
Fig. 7B

SYSTEM AND METHOD FOR MULTI-BAND ULTRA-WIDE BAND SIGNAL GENERATORS

RELATED APPLICATIONS

This application is a Continuation-In-Part of, and claims priority to, U.S. application Ser. No. 10/389,789, filed on Mar. 17, 2003, which application is hereby incorporated herein by reference in its entirety.

Additionally, this application claims priority to U.S. Provisional Application No. 60/404,070 filed on Aug. 16, 2002, and to U.S. Provisional Application No. 60/450,737, filed on Feb. 28, 2003, both of which applications are hereby incorporated herein by reference in their entirety. Furthermore, this application is related to U.S. application Ser. No. 10/603,372, filed on Jun. 25, 2003, and U.S. application Ser. No. 10/642,886, entitled, "Scalable Ultra-Wide Band Communication System," filed on Aug. 14, 2003, both of which applications are hereby incorporated herein by reference in their entirety.

BACKGROUND OF THE INVENTION

This invention relates in general to communication methods, systems, and apparatuses, and in particular to ultra-wide band based wireless communication methods, systems, and apparatuses.

The demand for short to medium range, high speed connectivity for multiple digital devices in a local environment continues to rise sharply. For example, many workplaces and households today have many digital computing or entertainment devices such as desktop and laptop computers, television sets and other audio and video devices, DVD players, cameras, camcorders, projectors, handhelds, and others. Multiple computers and television sets, for instance, have become common in American households. In addition, the need for high speed connectivity with respect to such devices is becoming more and more important. These trends will inevitably increase even in the near future.

As the demand for high speed connectivity increases along with the number of digital devices in typical households and workplaces, the demand for wireless connectivity naturally grows commensurately. High-speed wiring running to many devices can be expensive, awkward, impractical and inconvenient. High speed wireless connectivity, on the other hand, offers many practical and aesthetic advantages, which accounts the great and increasing demand for it. Ideally, wireless connectivity in a local environment should provide high reliability, low cost, low interference caused by physical barriers such as walls or by co-existing wireless signals, security, and high speed data transfer for multiple digital devices. Existing narrowband wireless connectivity techniques do not provide such a solution, having problems such as high cost, unsatisfactory data transfer rates, unsatisfactory freedom from signal and obstacle related interference, unsatisfactory security, and other shortcomings. In fact, the state of the art does not provide a sufficiently satisfactory solution for providing high speed wireless connectivity for multiple digital devices in a local environment.

The state of the art in wireless connectivity generally includes utilization of spread spectrum systems for various applications. Spread spectrum techniques, which spread a signal over a broad range of frequencies, are known to provide high resistance against signal blocking, or "jamming," high security or resistance against "eavesdropping," and high interference resistance. Spread Spectrum techniques have been used in systems in which high security and freedom from tampering is required. Additionally, Code Division Multiple Access (CDMA), a spread spectrum, packet-based technique, is used in some cellular phone systems, providing increased capacity in part by allowing multiple simultaneous conversation signals to share the same frequencies at the same time.

Known spread spectrum and modulation techniques, including CDMA techniques, direct sequence spread spectrum (DSSS) techniques, time hopping spread spectrum (THSS) techniques, and pulse position modulation (PPM) techniques, do not satisfactorily provide wireless connectivity in a local environment, including high reliability, low cost, low interference, security, and high speed data transfer for multiple digital devices. In addition, known UWB transmission and communication methods and systems lack satisfactory quality in areas that can include flexibility, adaptivity and adaptive trade-off capabilities in areas such as power usage, range, and transfer rates, and low cost implementation.

A number of U.S. and non-U.S. patents and patent applications discuss spread spectrum or UWB related systems for various uses, but are nonetheless in accordance with the above described state of the art. The U.S. and non-U.S. patents and patent applications discussed below are hereby incorporated herein by reference in their entirety.

There are several Japanese patents and applications in some of these areas. Japanese patent application JP 11284599, filed on Mar. 31, 1998 and published on Oct. 15, 1999, discusses spread spectrum CDMA mobile communications. Japanese patent application JP 11313005, filed on Apr. 27, 1998 and published on Nov. 9, 1999, discusses a system for rapid carrier synchronization in spread spectrum communication using an intermittently operative signal demodulation circuit. Japanese patent application JP 11027180, filed on Jul. 2, 1997 and published on Jan. 29, 1999, and counterpart European application EP 0889600 discuss a receiving apparatus for use in a mobile communications system, and particularly for use in spread spectrum Code Division Multiple Access communications between a base station and a mobile station. Japanese patent application JP 21378533, filed on Nov. 18, 1988 and published on May 25, 1990, discusses a transmitter for spread spectrum communication.

A number of U.S. patents and published applications discuss spread spectrum or UWB in various contexts. U.S. Pat. No. 6,026,125, issued Feb. 15, 2000 to Larrick, Jr. et al., relates to utilization of a carrier-controlled pulsed UWB signal having a controlled center frequency and an adjustable bandwidth. U.S. Pat. No. 6,351,652, issued Feb. 6, 2002 to Finn et al., discusses impulse UWB communication. U.S. Pat. No. 6,031,862, issued Feb. 29, 2000 to Fullerton et al., and related patents including U.S. Pat. Nos. 5,677,927, 5,960,031, 5,963,581, and 5,995,534, discuss a UWB communications system in which impulse derived signals are multiplied by a template signal, integrated, and then demodulated, to increase the usability if signals which would otherwise be obscured by noise. U.S. Pat. No. 6,075,807, issued Jun. 13, 2000 to Warren et al., relates to a spread spectrum digital matched filter. U.S. Pat. No. 5,177,767, issued Jan. 5, 1993 to Kato, discusses a "structurally simple" wireless spread spectrum transmitting or receiving apparatus which is described as eliminating the need for code synchronization. U.S. Pat. No. 6,002,707, issued Dec. 14, 1999 to Thue, relates to radar system using a wide frequency spectrum signal for radar transmission to eliminate the need for very high energy narrow pulse transmitter and receiver systems. U.S. Pat. No. 5,347,537, issued Jun. 21, 1994 to Mori, et al., and related patents including U.S. Pat. Nos. 5,323,419 and 5,218,620, discuss a direct sequence spread spectrum transmitter and receiver system. U.S. Pat. No. 5,206,881, issued Apr. 27, 1993, discusses a spread spectrum communication system attempting to use rapid synchronization of pseudonoise code signals with data packet signals.

A number of published PCT international applications also discuss spread spectrum or UWB in various contexts. PCT international application, publication number WO 01/39451 published on May 31, 2001, discusses a waveform adaptive transmitter for use in radar or communications applications. PCT international application, publication number WO 01/93441, published on Dec. 6, 2001, discusses a UWB high-speed digital communication system using wavelets or impulses. PCT international application, publication number WO 01/99300, published on Dec. 27, 2001, discusses wireless communications using UWB signaling. PCT international application, publication number WO 01/11814, published on Feb. 15, 2001, discusses a transmission method for broadband wired or wireless transmission of information using spread spectrum technology.

In accordance with all of the above, there is a need in the art for an improved communication methods and systems. Additionally, there is a need in the art for methods and systems to provide wireless connectivity between multiple digital devices in a local environment.

SUMMARY OF THE INVENTION

In one embodiment, the invention provides a method for transmitting information using ultra-wide band transmission. The method includes allocating, for signal transmission, each of a plurality of frequency sub-bands. The method further includes sending an ultra-wide band transmission comprising the information by transmitting a burst symbol cycle signal over each of the plurality of frequency sub-bands.

In another embodiment, the invention provides a fast switching frequency generator for facilitating generation of a multi-band ultra-wide band transmission, the generator including a circuit. The circuit includes at least one voltage controlled oscillator and at least one divider. The at least one voltage controlled oscillator is adapted for use in generating a signal of a particular center frequency. The at least one divider is adapted for use in facilitating generation of multiple transmission frequency bands of the multi-band ultra-wide band transmission by outputting, from an input signal of a particular center frequency, signals of different frequency multiples of a step frequency. In another embodiment, the invention provides a method for facilitating transmission of information using ultra-wide band transmission. The method includes generating a first digital signal for use in an ultra-wide band transmission. The method further includes substantially removing at least one harmonic from the first digital signal by subtracting, from the first digital signal, a second digital signal that is a delayed form of the first digital signal, to produce a third digital signal that is of substantially the same frequency as the first digital signal but that substantially does not include at least one harmonic included in the first digital signal.

In another embodiment, the invention provides a method for transmitting information using ultra-wide band transmission. The method includes allocating, for signal transmission, each of a plurality of frequency sub-bands. The method further includes sending an ultra-wide band transmission comprising the information by transmitting a signal over each of the plurality of frequency sub-bands. Phase continuity is maintained by dividing each of the frequency sub-bands into a plurality of segments, and cycling transmission between segments of each of the sub-bands.

In another embodiment, the invention provides a method for transmitting information using ultra-wide band transmission. The method includes allocating, for signal transmission, each of a plurality of frequency sub-bands. The method further includes sending an ultra-wide band transmission including the information by transmitting a signal over each of the plurality of frequency sub-bands, including producing at least one analog carrier wave of a frequency sub-band using outputs from a plurality of digital to analog converters.

In another embodiment, the invention provides a method for transmitting information using ultra-wide band transmission. The method includes allocating, for signal transmission, each of a plurality of frequency sub-bands. The method further includes sending an ultra-wide band transmission comprising the information by transmitting a signal over each of the plurality of frequency sub-bands, including using a sine wave envelope to reduce side lobes in at least one carrier frequency, including multiplying a signal by a sine wave of a lower frequency than the carrier frequency.

In another embodiment, the invention provides a method for facilitating transmission of information using ultra-wide band transmission. The method includes generating at least one carrier wave for use in an ultra-wide band transmission. The method further includes isolating a single monocycle from the carrier wave by producing a first signal that is a delayed form of the carrier wave and combining the carrier wave with the first signal to isolate a single monocycle.

In another embodiment, the invention provides a method for facilitating transmission of information using ultra-wide band transmission. The method includes generating a narrow-band pulse signal for use in an ultra-wide band transmission, including generating a first pulse signal; producing a second pulse signal that is a delayed form of the first pulse signal; and, using a differential amplifier, subtracting the first pulse signal from the second pulse signal to produce the narrow-band pulse signal.

In another embodiment, the invention provides a method for facilitating transmission of information. The method includes generating an ultra-wide band signal, including: generating a first ultra-wide band carrier signal; combining the first carrier signal with a sine wave envelope to generate a first combined signal with reduced side lobes relative to the first carrier signal; combining the first combined signal with an information signal to generate a second combined signal; and transmitting the second combined signal as at least part of a multi-band ultra-wide band transmission.

In another embodiment, the invention provides a method for facilitating transmission of information. The method includes generating an ultra-wide band signal, including combining an information signal with a sine wave envelope to generate a first combined signal; combining the first combined signal with a generated carrier signal to generate a second combined signal with reduced side lobes relative to the generated carrier signal; and transmitting the second combined signal as at least part of a multiband ultra-wide band transmission.

Additional aspects of the present invention will be apparent in view of the description which follows.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 4 is a chart depicting a technique for dividing each carrier signal into 4 equal length segments, according to one embodiment of the invention;

FIG. 7A is a graph of the time domain and of a signal with an envelope, according to one embodiment of the invention;

FIG. 7B is a graph of the frequency domain and of a signal with an envelope, according to one embodiment of the invention;

DETAILED DESCRIPTION

A multi-band ultra-band transmission scheme is an extension of single band ultrawide band (UWB) system. In a multi-band ultra-wide band system each band is itself a UWB signal. Each of the sub-bands may be a single band signal. The multiple signals can be transmitted together in serial or they can be transmitted in parallel on different frequency bands. Each sub-band, viewed independently, may utilize a discontinuous transmission scheme. Each of the sub-bands may, for example, use pulse and quiet time transmission or may be transmitted using an OFDM symbol and quiet time.

In some embodiments, signals may be transmitted on multiple bands using a burst symbol cycle, or discontinuous, transmission scheme. A burst symbol cycle transmission includes an ON period during which one or more symbols are transmitted, and an off period during which no signal is transmitted. Further details regarding burst symbol cycles and burst symbol cycle transmission can be found in previously incorporated by reference U.S. application Ser. No. 10/603, 372, filed on Jun. 25, 2003

In some embodiments of multi-band ultra-wide band transmission or reception according to the invention, the same signal frequency and phase are maintained from the end of an ON period to the beginning of the following ON period. In some embodiments, the same signal frequency is maintained from the end of an ON period to the beginning of the following ON period.

Multiple bands may be generated in a number of ways. After the signals are generated various transmission schemes exist. In one embodiment, several sub-bands are transmitted in parallel, each independently utilizing on the discontinuous transmission scheme. In another embodiment, the various sub-band signals are transmitted staggered in time. In this last-mentioned embodiment the on period of the various signals may occupy a different period in time. While the overall time domain may or may not exhibit discontinuous behavior, each band viewed independently may still be discontinuous.

Each sub-band in a multi-band UWB may carry multiple data signals. Several pulse shapes may be combined to form a single UWB transmission, either as a single band transmission or as a single band of a multi-band transmission. In one embodiment, for example, both the I portion and the Q portion of a single frequency QPSK signal may carry separate data and may be transmitted on a single band.

Figure 1:
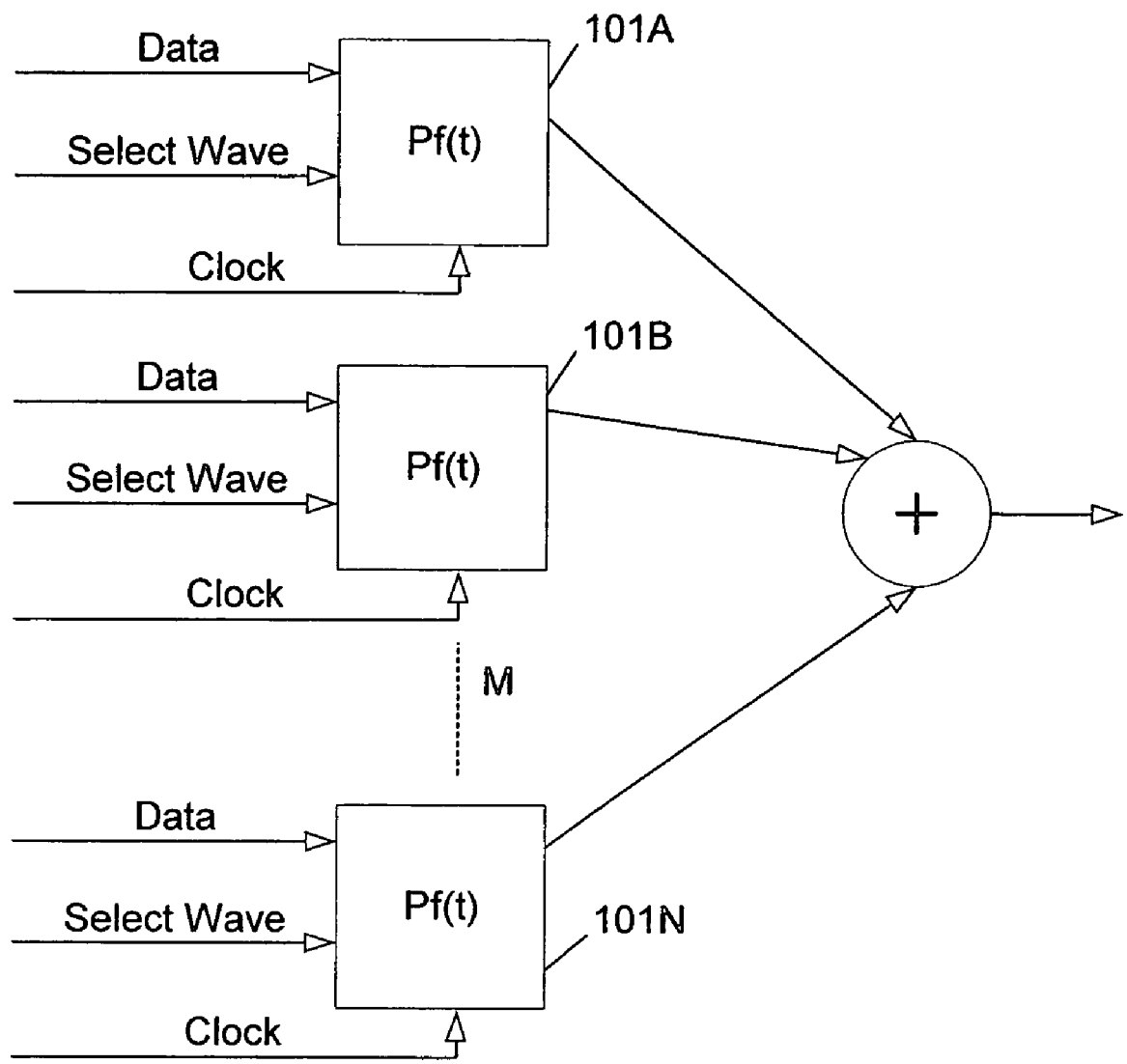
FIG. 1 is a block diagram depicting multiple generators combined to generate one or more of the sub-bands in a multi-band UWB system, according to one embodiment of the invention.

FIG. 1 presents one embodiment of how multiple signal generators may be combined to generate one or more of the sub-bands in a multi-band UWB system. Each block 101A through 101N represents a different wave form that may comprise a single sub-band. In some embodiments, to generate multiple bands of a multi-band signal that will be transmitted in parallel, separate groups of wave generators 101 will be needed for each sub-band. If, in another embodiment, the signals are transmitted in serial, then the individual generators 101 may be reused for different sub-bands.

In one embodiment, there are 14 possible pulse shapes. The 14 possible pulse shapes represent the sine and cosine of seven different sub-bands. Of those 14 pulse shapes, 4 may be transmitted together. That is, groups of two sub-bands are transmitted in parallel; the groups are transmitted in serial. Each of the four simultaneously transmitted shapes may carry different data. The four simultaneously transmitted pulse shapes represent the I and Q or sine and cosine of two different frequencies or sub-bands. On each pulse four bits of data may be transmitted. After transmitting a given set of pulses based on one set of frequencies, the next set of pulses may be selected from another two of the seven sub-bands. Multiple sub-bands can be sent in parallel and then later in serial.

In other embodiments, the number of possible sub-bands may be greater or less than seven. Furthermore, the number of bands transmitted simultaneously may vary. In addition, in other embodiments, the number of wave forms sent on a particular frequency can be greater or less than two. The order of the frequencies depends on the system and may vary across different systems.

Transmitting the different sub-bands in multiple orders allows multiple pico-nets to operate simultaneously. Multiple pico-nets could, in some embodiments, transmit using the same set of sub-bands while avoiding interference by cycling through the sub-bands where each pico-net uses a different order. Frequency order selection could, in some embodiments, be similar to FDMA, where sequences are checked to see which are in use and an empty one is selected.

In implementing a multi-band UWB signal generator it is desirable to implement a transmitter that can rapidly switch between frequencies. Having such a transmitter is more efficient from an implementation standpoint as it avoids a complex parallel transmitter or receiver.

In some embodiments, the transmitter may transmit (and the receiver receive) some subset of the possible sub-bands. To rapidly switch sub-bands and to allow for a continuous transmission of multiple sub-bands in serial, it is necessary to have a fast switching transmitter and receiver. What follows is a description of various ways to achieve fast frequency switching.

Figure 2:
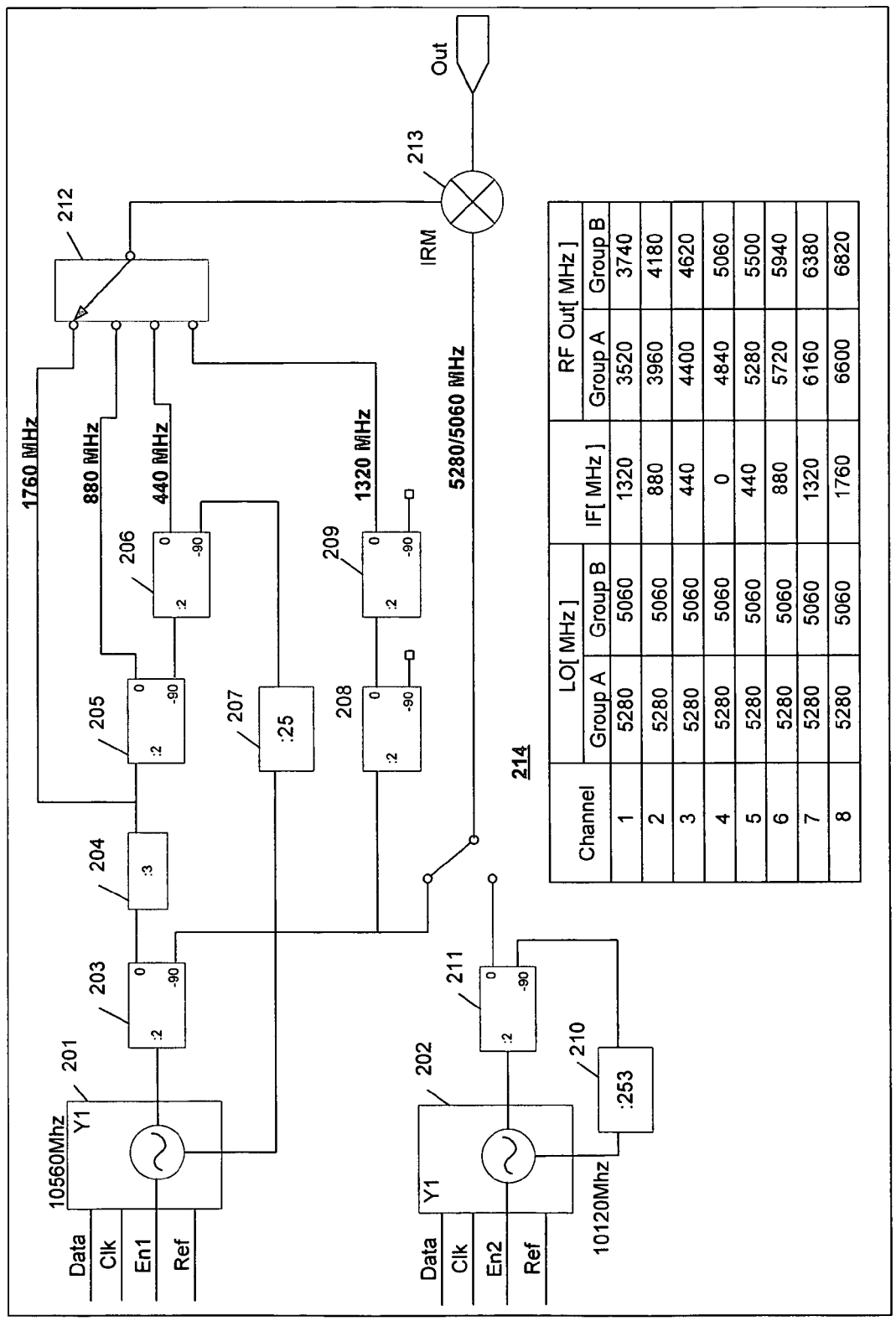
FIG. 2 is a circuit diagram relating to a fast switching frequency generator, according to one embodiment of the invention.

With reference to FIG. 2, a circuit diagram of one embodiment of a fast switching frequency generator is shown. The circuit comprises voltage-controlled oscillators (VCO) 201 and 202, dividers 203 through 209, a mux 212 and a mixer 213. The dividers, normally used in a phase locked loop to generate a single frequency, are here used to generate multiple frequencies from a single center frequency.

In some embodiments, one or more analog wave generators are used. In some embodiments, one or more digital wave generators are used. Furthermore, in some embodiments, one or more wave generators are used that are combination digital and analog.

In the embodiment depicted in FIG. 2, two center frequencies are generated by VCOs 201 and 202. The center frequencies are multiplied by integer multiples of a step frequency to generate multiple bands. Specifically, the step frequency is 440 MHz. The first VCO 201 generates a center frequency of 5280 MHz, which is itself a multiple of the step frequency. The center frequency is connected to a group of dividers 203-209, which output the various multiples of the step frequency. These step multiples are the input to the mux 212, which outputs to the multiplier 213. Various multiples of the step frequency can be selected by the selection of different inputs to the mux 212. The multiplier 213 takes as its second input the center frequency and outputs the selected step multiple multiplied by the center frequency. In some embodiments in which QPSK modulation is used, an input signal is multiplied with a data signal prior to generating signals of different frequency multiples of a step frequency, which can allow the use of a narrowband mixer, whereas, to modulate a multi-band signal, a wideband QPSK mixer can be required.

In order to switch frequencies, the input to the mux 212 is switched, which changes the multiple by which the center frequency is being multiplied. In this embodiment, all the frequencies are available at all times so that switching can be accomplished rapidly without waiting for components to stabilize. In addition, only one VCO is necessary.

In certain embodiments, the addition of a second VCO 202 allows frequencies to be generated where the center is not a strict integer multiple of the step frequency. In this embodiment the second VCO 202 produces a center frequency of 5060 MHz, which is 11.5 times the step frequency.

The table 214 shows the various channels or sub-bands generated from the two center frequencies, Group A and Group B. Having two center frequencies helps to avoid interference across multiple bands. That is, if interference is detected in two adjacent bands, thereby rendering them useless, another center frequency can be selected, thereby moving the interference to a single band for greater bandwidth utilization.

In other embodiments, other center frequencies and step frequencies may be used. In addition, in other embodiments, switching components off when not needed may improve (decrease) current consumption. For example, in some embodiments, during OFF periods of transmissions or receptions, power is switched or cycled off with respect to a transmitter, a receiver, or one or more components or circuits thereof.

Digital Signals, for example, those generated by the circuit in FIG. 2, have harmonics. In addition to the desired output signal, there is an unwanted output of a signal on undesired frequencies due to the harmonics.

In one embodiment, the harmonics may be removed using filters. One negative aspect of using filters is that they occupy a large space in a circuit. In addition, they are analog and hard to calibrate and manufacture.

Figure 3:
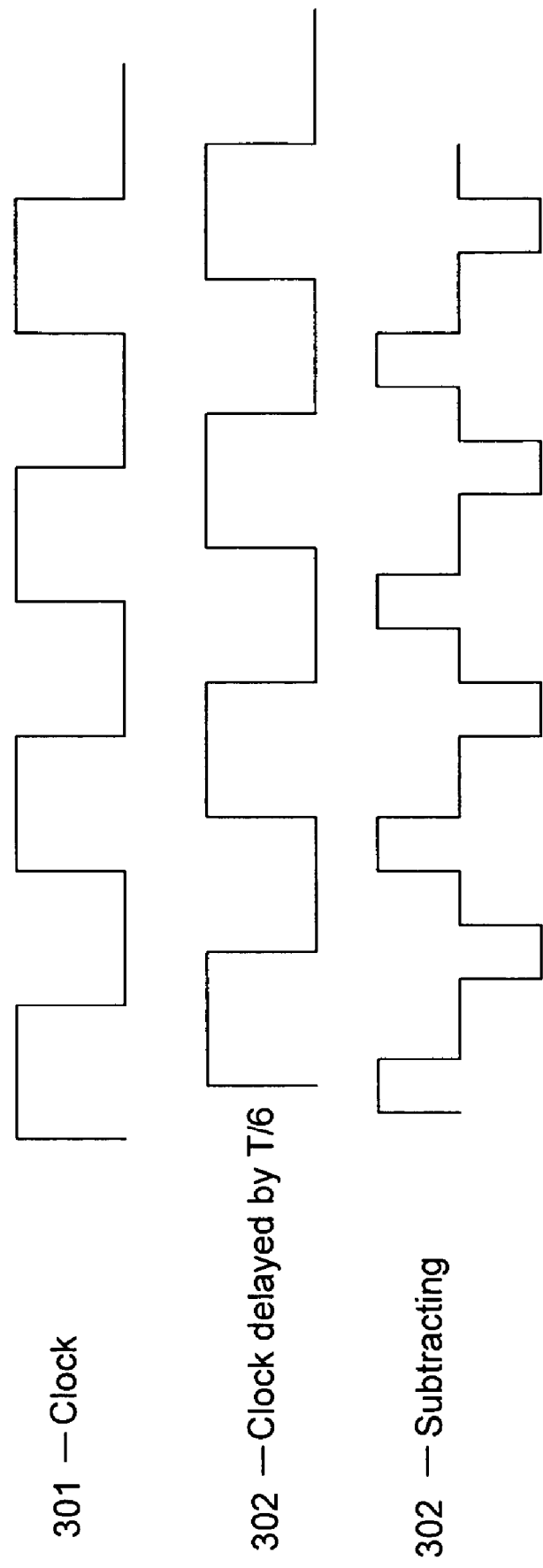
FIG. 3 is a timing diagram that depicts a technique for digitally removing harmonics, according to one embodiment of the invention.

With reference to FIG. 3, a way of digitally removing harmonics is presented. Clock signal 301 represents a signal with undesired harmonics. In this embodiment all the even harmonics are absent from the signal because of the 50 percent duty cycle of the clock. The third harmonic is removed by delaying the clock cycle by T/6, as shown by reference number 302. When the delayed clock 302 is subtracted from the clock 301 a ternary signal 303 results. The new signal 303 has the same frequency as the original clock 301 but the third harmonic is absent.

In one embodiment, the clock can be the step frequency of 440 MHz used in FIG. 2. Since the clock operates at a 50% duty cycle, the even harmonics are not present. The third harmonic lies in a band where interference should be limited, and therefore the harmonic should be removed. The next harmonic, the $5^{th}$, lies outside the range of concern.

In some embodiments, the processing may be accomplished without the use of digital to analog converters. Almost all the processing is done digitally without the need for analog components. The subtractor may be analog.

The subtraction, in some embodiments, may be accomplished by connecting the two streams to the differential inputs of a mixer. In such an embodiment a switch mixer may then be used, rather than a linear mixer. This mechanism may be used generally to generate a three level or ternary signal from two binary signals.

In another embodiment, the fifth harmonic can be removed by subtracting two ternary signals. By using a delay smaller than T/6, for example T/10, the fifth harmonic can be removed. To remove both the third and the fifth harmonics together the method would need to be performed twice. A signal delayed T/6 is subtracted from the original clock signal. The result of first subtraction is delayed by T/10 and subtracted from the result of the first subtraction. The resulting signal has both the third and the fifth harmonics removed.

In one embodiment, this result is implemented using binary signals. The first set operates as in FIG. 3, this first result being a signal with no third harmonic. A second signal is generated by subtracting a clock delayed by an additional T/10 from the original clock frequency. This second result is the first result delayed by T/10 or a delayed version of the original clock without the third harmonic. The difference of the second result and the first result is the original clock without the third and fifth harmonics.

In other embodiments, different phases of the frequency can be generated. This can be done using only digital elements with no need for an additional mixer to modulate the data onto the carrier. Different delays of the original clock can produce different phases of the output signal. In addition, hopping can be done in zero time allowing for back to back pulses. One embodiment uses different phases of the dividers in the circuit to achieve this.

In rapidly switching between frequencies for sub-bands, it is important that transmissions on any given frequency remain consistently in phase. One way of achieving phase consistency is shown in table 400 of FIG. 4. In the table the actual transmitted signal is designated "Multi Carrier". The Multi Carrier is an aggregate signal comprising segments from three sub-bands designated carriers A, B, and C. The Multi Carrier will transmit on each frequency in a round robin fashion starting with carrier A then rapidly switching to carrier B, then rapidly switching to carrier C and then back to carrier A.

When returning to a specific carrier, resuming the sequence from the last transmitted point will result in shifting the phase of the carrier signal in the transmitted signal. Rather, the transmitted signal should continue from the point where the carrier signal would have been, had it been transmitted continuously.

For example, in the embodiment illustrated in FIG. 4, each carrier signal is divided into 4 equal length segments. Each segment represents a carrier wave without data. Each segment may contain numerous binary or ternary bits. The Multi Carrier transmits the first segment, shown as "1A" from carrier A. When rapidly switching to carrier B, the multi-carrier signal will begin with segment 2B of carrier B. That is, it will operate as if segment 1B of carrier B had been transmitted. In such an embodiment, the multi-carrier needs 12 segments to transmit all segments of all carriers. This scheme ensures phase consistency among and between carrier signals.

The scheme depicted in FIG. 4 is well suited for a completely digital transmission mechanism. In contrast to the generator in FIG. 2, where each frequency is being continuously generated and switched to when needed, and therefore there is no danger of the signals becoming out of phase, a fully digital scheme only produces a carrier wave when needed. It is therefore important to ensure that the phase will be coherent. For example, the signal 303 in FIG. 3 may be described by a sequence of 1's, 0's and −1's. The signal may be described in a higher resolution than the actual frequency, i.e. the zero in the signal could be represented by "0000". The signal would be divided into 4 equal length segments as depicted in FIG. 4. In that embodiment, two other carriers would be encoded similarly. Each carrier could be stored as a template in RAM and the signal generator that produces the Multi Carrier would transmit the stored sequences in the order described in table 400.

Figure 5:
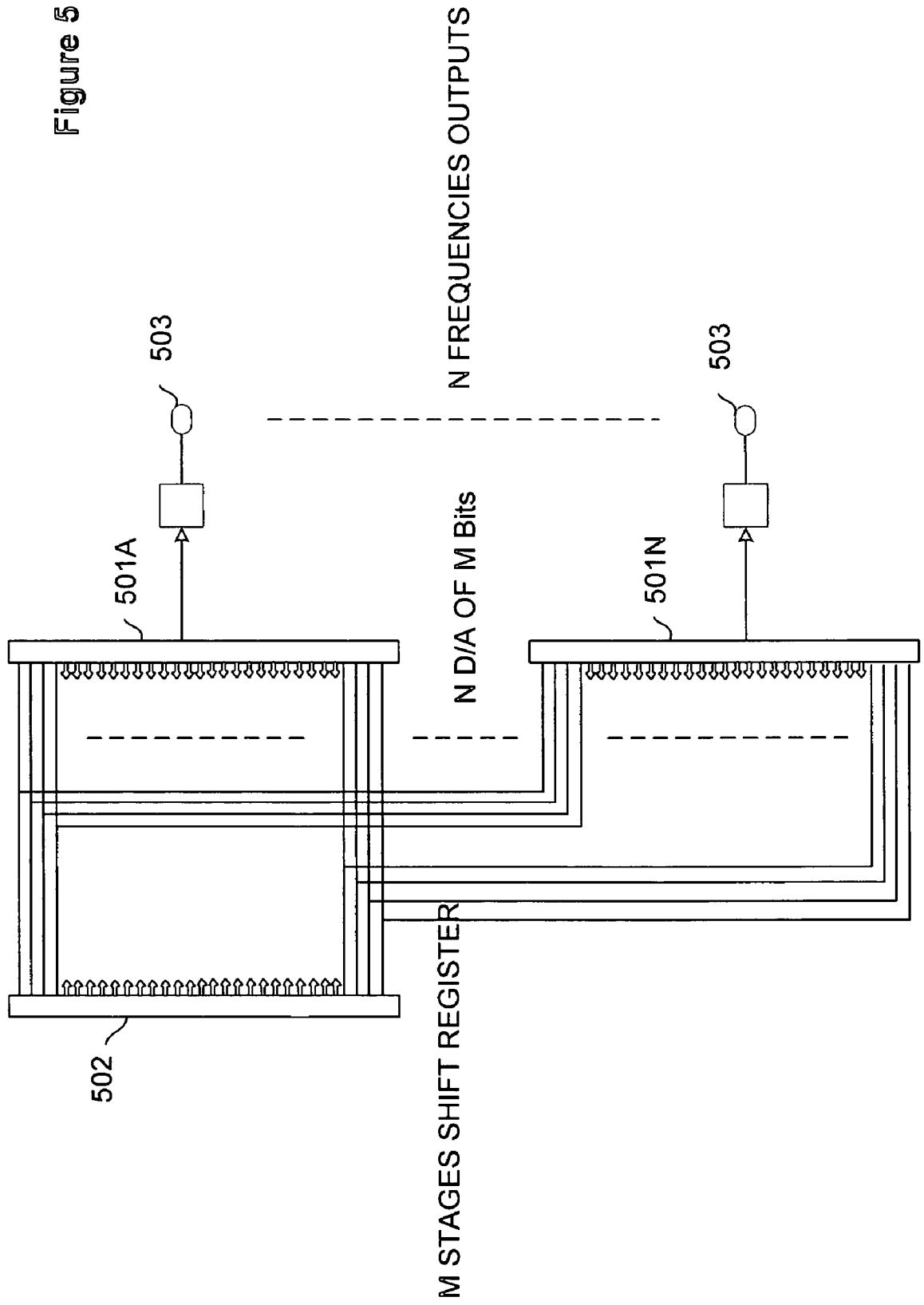
FIG. 5 is a circuit diagram relating to a method for generating sub-band carrier waves using digital to analog converters (D/A) and shift registers, according to one embodiment of the invention.

With respect to FIG. 5, a system for generating various sub-band carrier waves using digital to analog converters (D/A) and shift registers, is presented.

For each of N transmitted sub-band carrier waves there is a D/A, 501A-501N. Each D/A is programmed to output a portion of the analog carrier wave based on a given input. Each D/A may have a different set of analog quantization levels. For example, in one embodiment the D/As are 32 bits, each input bit will produce 1/32 of the output carrier wave. By cycling through the inputs the entire analog carrier wave can be produced.

A shift register 502 is used to cycle through the possible inputs, in order. In the embodiment being discussed a 32 bit shift register is used. Input to the shift register is a one followed by only zeros, which produces an output of 1. As the bits are shifted the one is shifted and subsequently produced at each of the outputs consecutively. When the one reaches the end of the register it is cycled back as the input and the process repeats.

Each output is attached to the inputs of the D/As so that a one on the first output of the register produces the first portion of the analog carrier wave.

Referring back to FIG. 4, the desired sequence for overall output is to switch between various pieces of each carrier wave. In one embodiment, if each carrier wave is represented by 32 bits and divided into 4 sequences, each sequence would be 8 bits. That is, bits 0 through 7 would produce the first sequence, and so on. To switch between outputs of the D/As 501A-501N an element is used to select the frequency after the output port 503. That is, all carrier waves are generated simultaneously and selected outputs are transmitted based on a given sequence. In other embodiments, the output of the shift register may be redirected to different D/As when output of that carrier wave is needed.

In other embodiments, the carrier waves may be represented by any number of bits. The D/A and shift registers may then be of any bit size.

The pulses generated by the previous embodiments are given an envelope to control the shape of the frequency. Multiplying the signal in the time domain by a sine wave changes the shape of the frequency spectrum by reducing the side lobes and widening the bandwidth. In one embodiment, the side lobes are reduced from approximately 13 dB below the center to approximately 23 dB below the center. The envelope sine wave has a frequency lower than the carrier frequency. In one embodiment it is a 4 ns wave compared to the 250 ps carrier frequency.

With reference to FIGS. 7A and 7B, a graph of the time domain and frequency domain of a signal with an envelope is shown. FIG. 7A shows the carrier signal—the signal with the high frequency, shaped by half a sine wave. The frequency spectrum of that signal is shown in FIG. 7B. The side lobes are about 23 dB below the center frequency. This presents an improvement over the carrier frequency with a square shape, one with no envelope, which would have side lobes that are only about 13 dB lower than the center.

Figure 6:
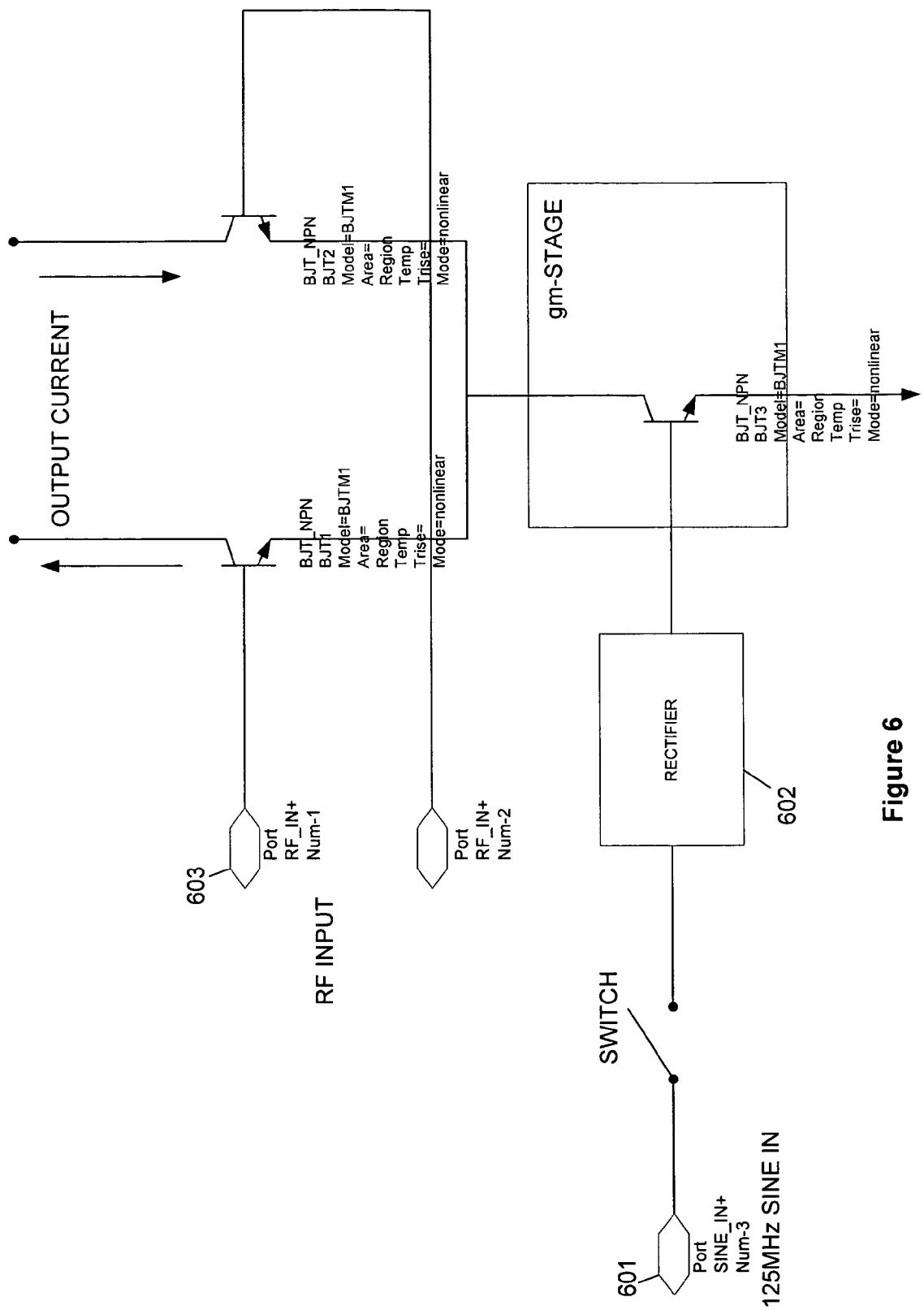
FIG. 6 is a circuit diagram relating to a circuit that can be used to multiply a carrier signal by an envelope, according to one embodiment of the invention.

FIG. 6 presents one embodiment of a circuit that can be used to multiply the carrier signal by an envelope. The input sine wave 601 is sent through a half-wave rectifier 602 that will result in just the positive half of the sine wave. Usage of the rectifier, through adjustment of the threshold, allows for control of the spectral behavior of the resultant half sine wave. For example, increasing the threshold reduces the size of the remaining wave, thereby decreasing the length of the pulse of the envelope. The envelope would remain constant for all different sub-bands. Differences in the sub-band frequencies would be seen, for example in FIG. 7A, as differences of the frequencies within the envelope. The carrier wave would be input in the input 603. The rapidly switched frequencies would all input to the circuit at 603 and would be multiplied by the envelope sine wave from the rectifier 602. In some embodiments, pulse bandwidth is changed while pulse repetition frequency remains constant, to facilitate control of signal spectrum characteristics and receiver selectivity.

The circuit in FIG. 6, in some embodiments, can be a piece of a complete mixer. In the mixer the data would be multiplied onto the carrier wave. The envelope would be input on the port normally used for a constant DC current. In this embodiment, a sine wave is used instead of the constant current. In the complete mixer the data would be multiplied onto the carrier signal in parallel to the envelope. The data input is not depicted in FIG. 6. In this embodiment, the multiplication only works when it is of a lower frequency than the carrier wave.

In another embodiment not using a mixer circuit, to reduce the side lobes each sub-band carrier would need a filter. The output would be selected after the filter. The circuit in FIG. 6 achieves the same result without multiple filters and with a single element for all carrier frequencies. The multiplier circuit eliminates the space and difficulty of using and manufacturing filters.

In other embodiments, other circuits may be used to create a sine wave envelope for the carrier. These other embodiments would also decrease the side lobes and increase the bandwidth.

When transmitting UWB signals, it may be necessary to generate a narrow pulse in order to create the ultra-wide spectrum. What follows are various techniques for isolating a single pulse cycle from a carrier wave. Previously, generating wide band signals with controlled properties was difficult. Particularly, using completely digital methods, generating a controlled pulse signal was difficult due in part to difficulty in controlling the exact rise and fall times of the signal.

Figure 8:
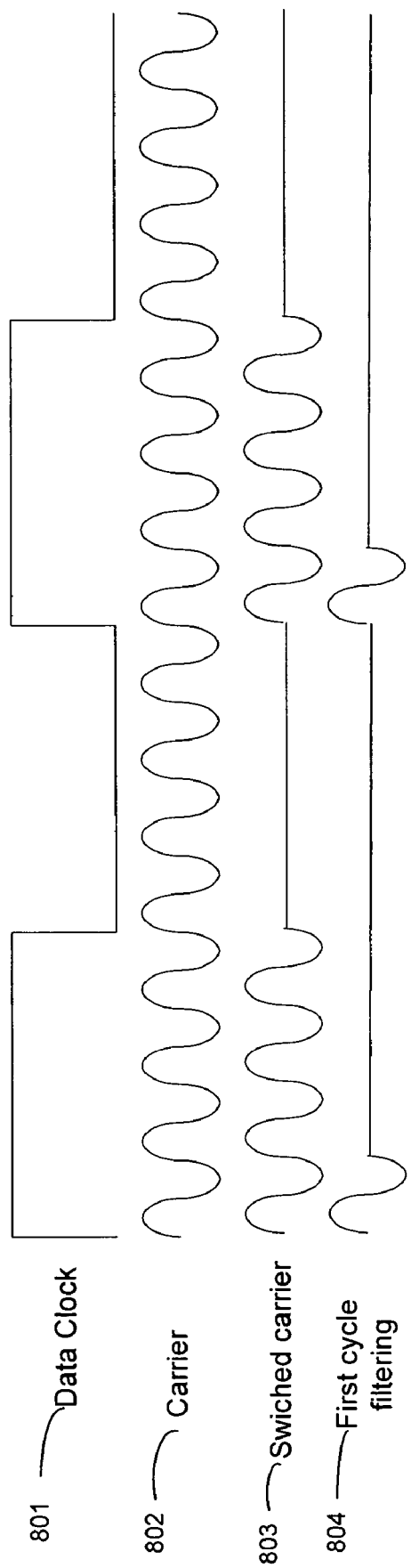
FIG. 8 is a timing diagram depicting a single monocycle extracted from a carrier wave, according to one embodiment of the invention.

FIG. 8 depicts a single monocycle extracted from a carrier wave. A carrier wave 802 is multiplied by a slow data clock 801 to isolate a group of cycles 803. A single monocycle 804 can be isolated from the group of cycles 803 using the schemes discussed below. The resultant monocycle has many properties similar to the carrier wave and various aspects can be controlled through controlling the carrier wave 802, such as rise and fall time and frequency.

Figure 9:
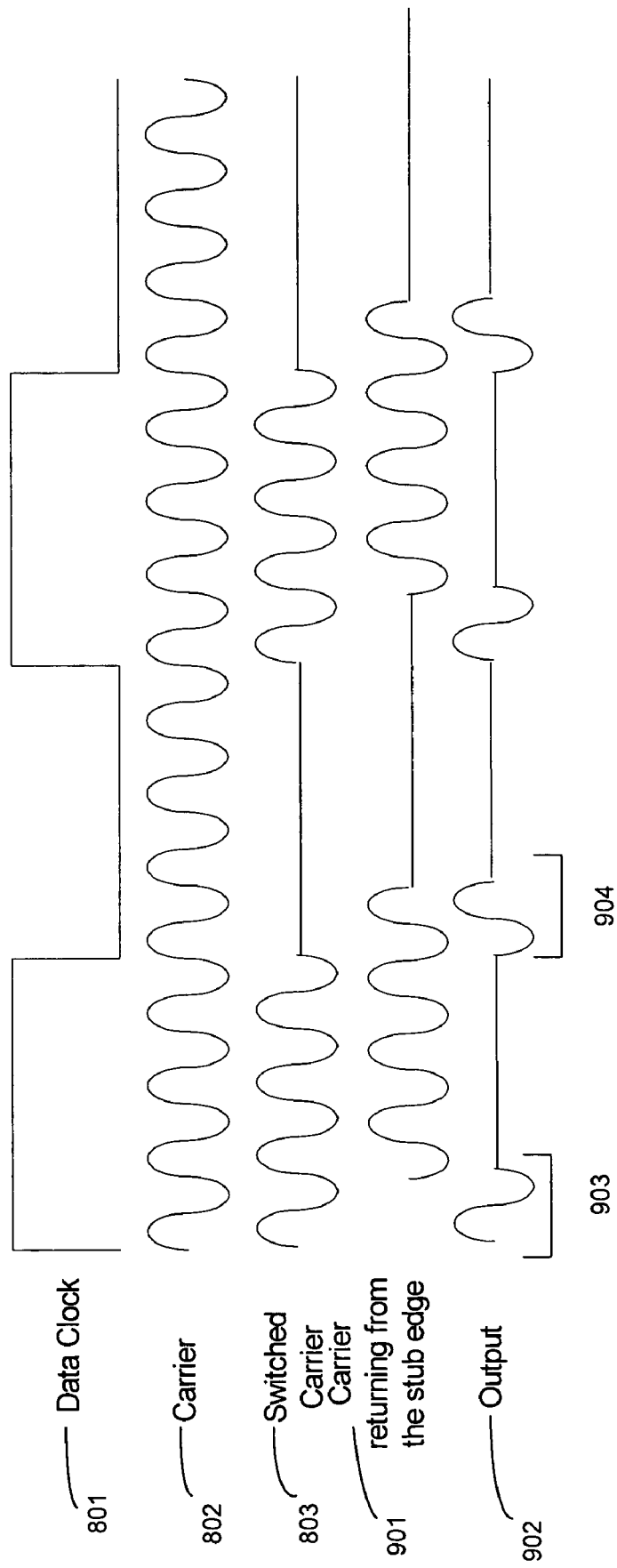
FIG. 9 is a timing diagram depicting a technique for isolating the monocycle from among a group of cycles, according to one embodiment of the invention.

One way of isolating the monocycle from among a group of cycles is shown in FIG. 9. The result depicted in FIG. 9 may be implemented using a stub. In FIG. 9 the carrier 802 is multiplied by a slow data clock 801, thereby isolating a group of cycles 803. The resultant signal 803 is fed to a stub, which will delay the signal by one cycle 901. The two signals 901 and 803 are combined with the result being an output of a single cycle 902.

In one embodiment, the first switch may be implemented using a diode. The second stage may be implemented using a stub of 0.5 wavelengths with the edge connected to ground. The resultant wave 902 will have a negative residue at the end of the pulse. This can be removed by using a clock with half the required pulse frequency, where there will be a positive polarity monocycle from the rising edge of the clock and a negative polarity monocycle from the falling edge of the clock. The negative monocycle can be cancelled by multiplying every even pulse by −1. This may be done by changing the polarity of the even data bits or chips.

Figure 10:
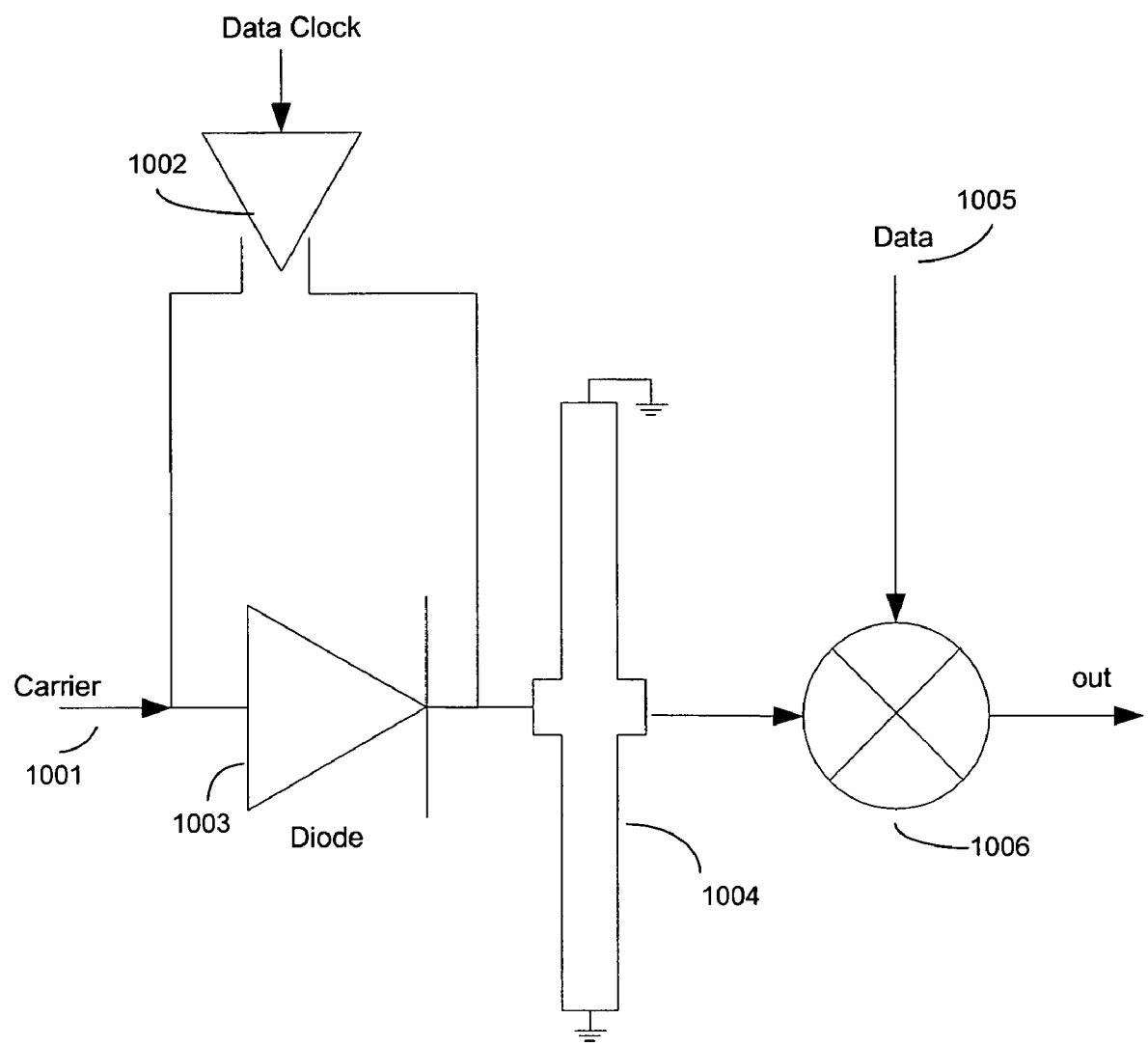
FIG. 10 is a circuit diagram illustrating a technique for carrier switching, according to one embodiment of the invention.
Figure 11:
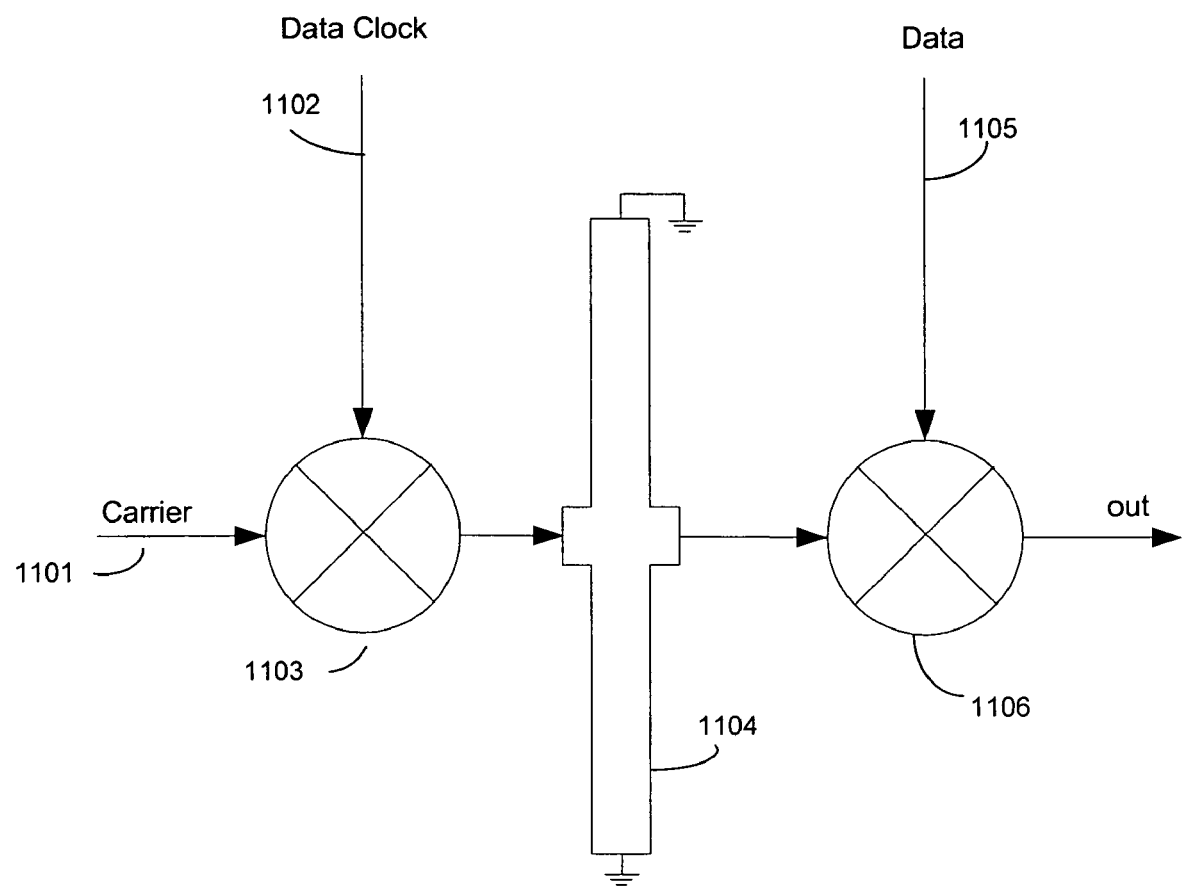
FIG. 11 is a circuit diagram illustrating another technique for carrier switching, according to one embodiment of the invention.

FIGS. 10 and 11 depict two embodiments of how carrier switching can be implemented In FIG. 10 an embodiment is shown that achieves fast carrier switching using a diode 1003. In this embodiment, the carrier 1001 is switched on and off with a duty cycle of 50% using the diode 1003. The signal is then passed through the stub 1004. The data 1005 is multiplied onto the resultant signal using a mixer 1006.

In another embodiment, shown in FIG. 11, the carrier 1101 is switched by multiplying by the clock signal with a mixer 1103. The signal is then passed through a stub 1104. The data 1105 is multiplied onto the resultant signal using another mixer 1106.

Figure 12:
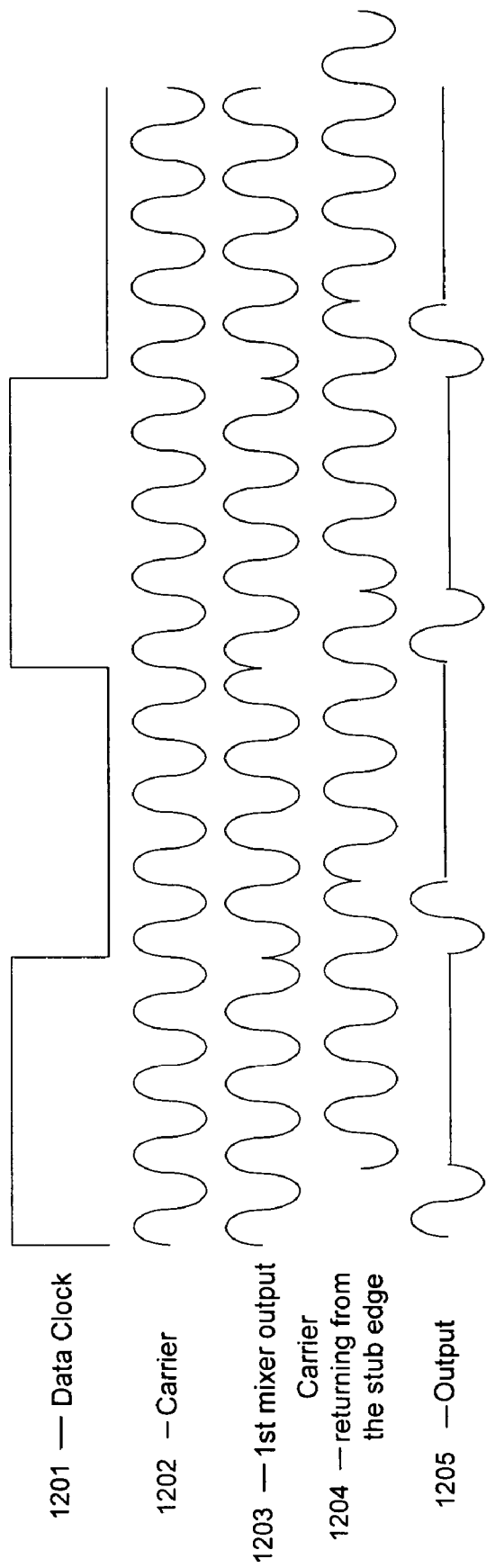
FIG. 12 is a timing diagram illustrating isolation of a single monocycle using the technique illustrated with reference to FIG. 11, according to one embodiment of the invention.

FIG. 12 shows how the embodiment depicted in FIG. 11 achieves the isolation of a single monocycle. The data clock 1201 is mixed with the carrier 1202 resulting in signal 1203. The resultant signal 1203 is fed to a stub, which will delay the signal by one cycle 1201. The two signals 1201 and 1203 are combined with the result being an output of a single cycle 1205.

Figure 13:
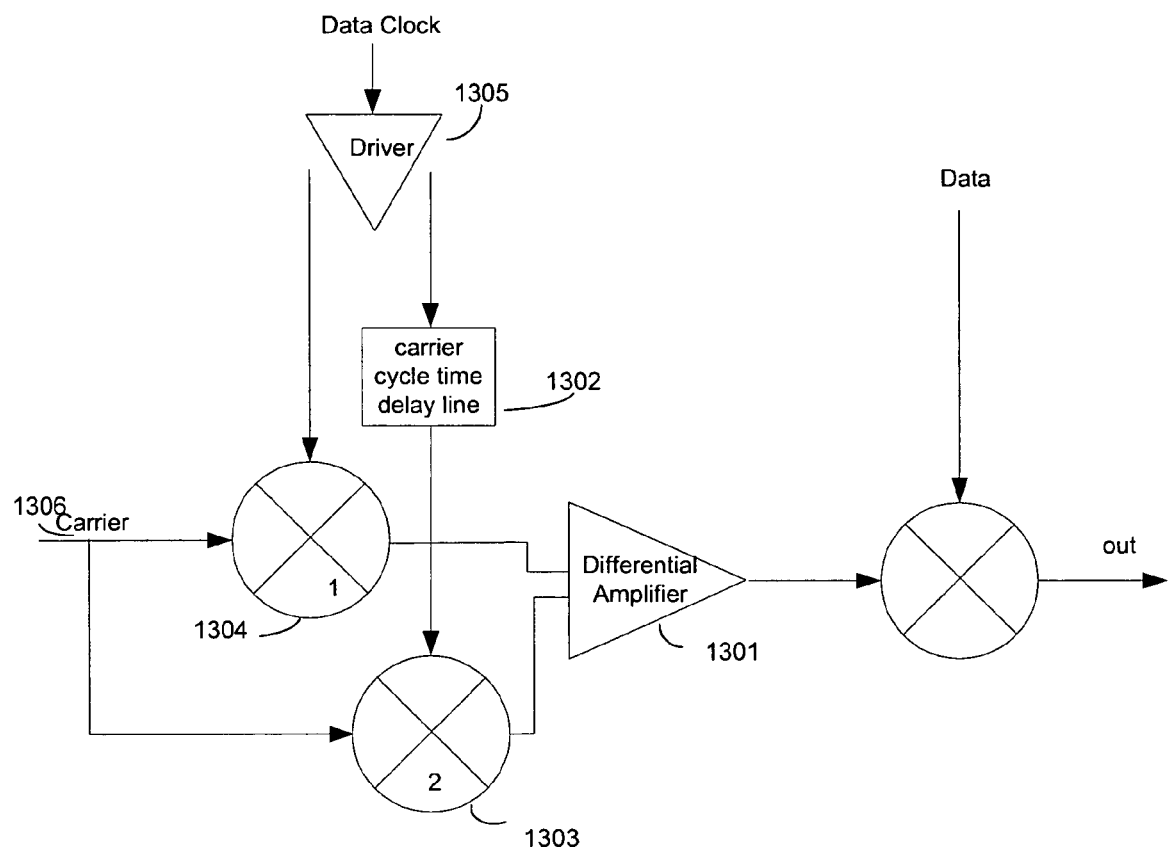
FIG. 13 is a circuit diagram illustrating a technique for isolating a single monocycle using a stub, according to one embodiment of the invention.

In another embodiment, similar results may be achieved using an active stub configuration depicted in FIG. 13. Using active elements enables certain embodiments to be implemented on a chip. In this embodiment the stub is replaced with a differential amplifier 1301 and a delay line 1302. Rather than delaying the carrier, like was done in other embodiments, in this embodiment the signal by which the carrier is multiplied 1305 is delayed. The carrier 1306 is multiplied by the data clock 1305 in mixer one 1304 and the carrier is multiplied by a delayed data clock in mixer two 1303. The two resultant signals are subtracted using the differential amplifier 1301, which results in a signal with a single monocycle.

Figure 14:
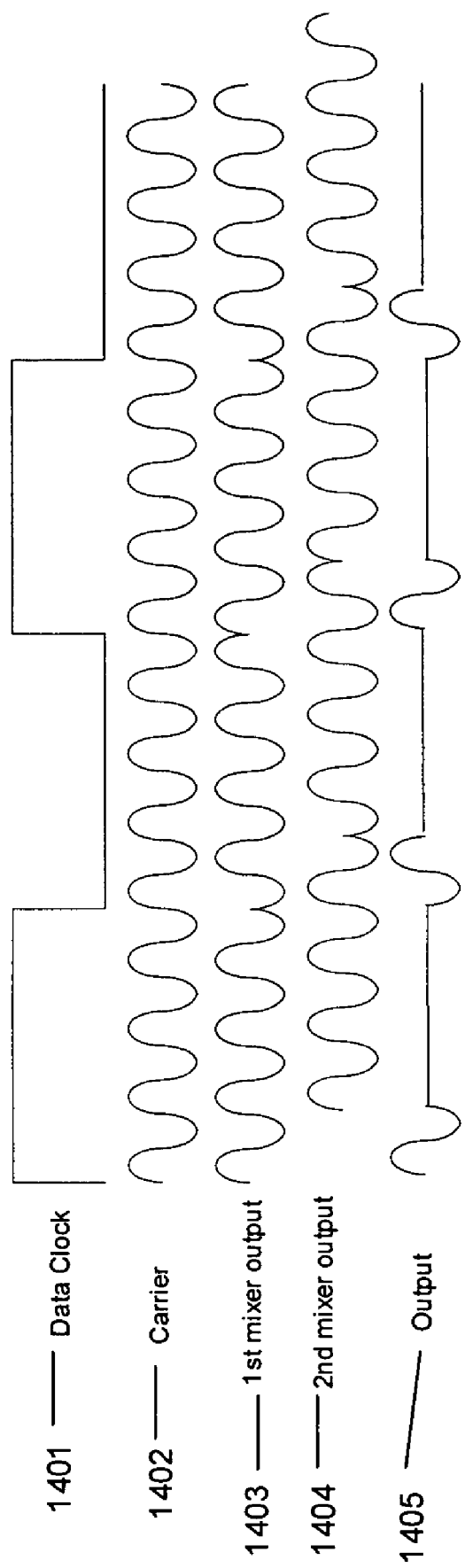
FIG. 14 is a timing diagram illustrating isolation of a single monocycle using the technique illustrated with reference to FIG. 13, according to one embodiment of the invention.

FIG. 14 shows the how the embodiment depicted in FIG. 13 achieves the isolation of a single monocycle. The data clock 1401 is multiplied by the carrier 1402, resulting in the signal 1403. The data clock 1401 is delayed and multiplied by the carrier 1402, resulting in the signal 1404. The subtraction of signals 1404 and 1403 results in an isolated monocycle 1405.

In some of the embodiments the isolation of a monocycle results in monocycles appearing both positively and negatively. In example can be seen in FIG. 9 where some monocycles are positive 903 and some are negative 904. Other examples may be seen in other embodiments. In some embodiments, this effect may be compensated for by altering the data signal that is modulated onto the carrier signal.

In other embodiments pulses may be generated using a carrierless transmission scheme.

Figure 15:
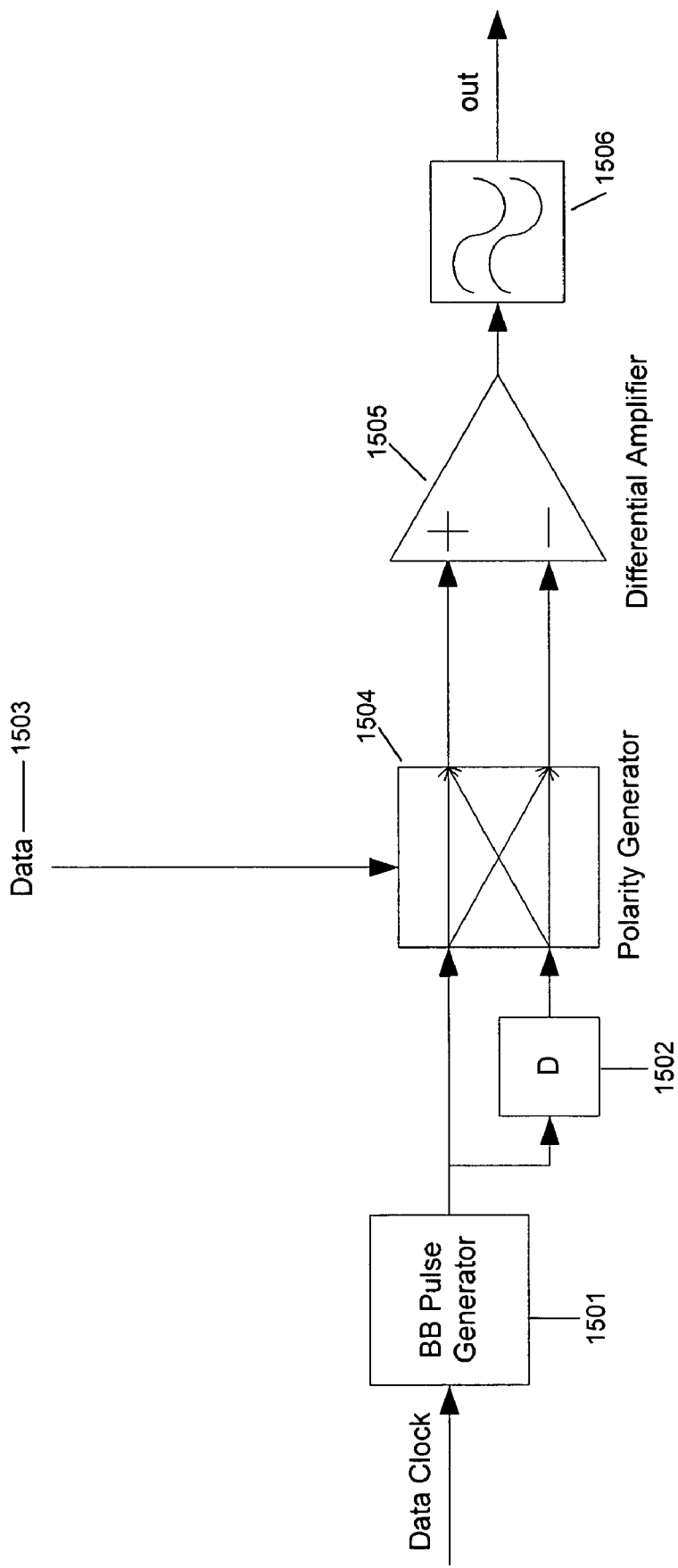
FIG. 15 is a circuit diagram relating to a carrierless transmitter, according to one embodiment of the invention.
Figure 16:
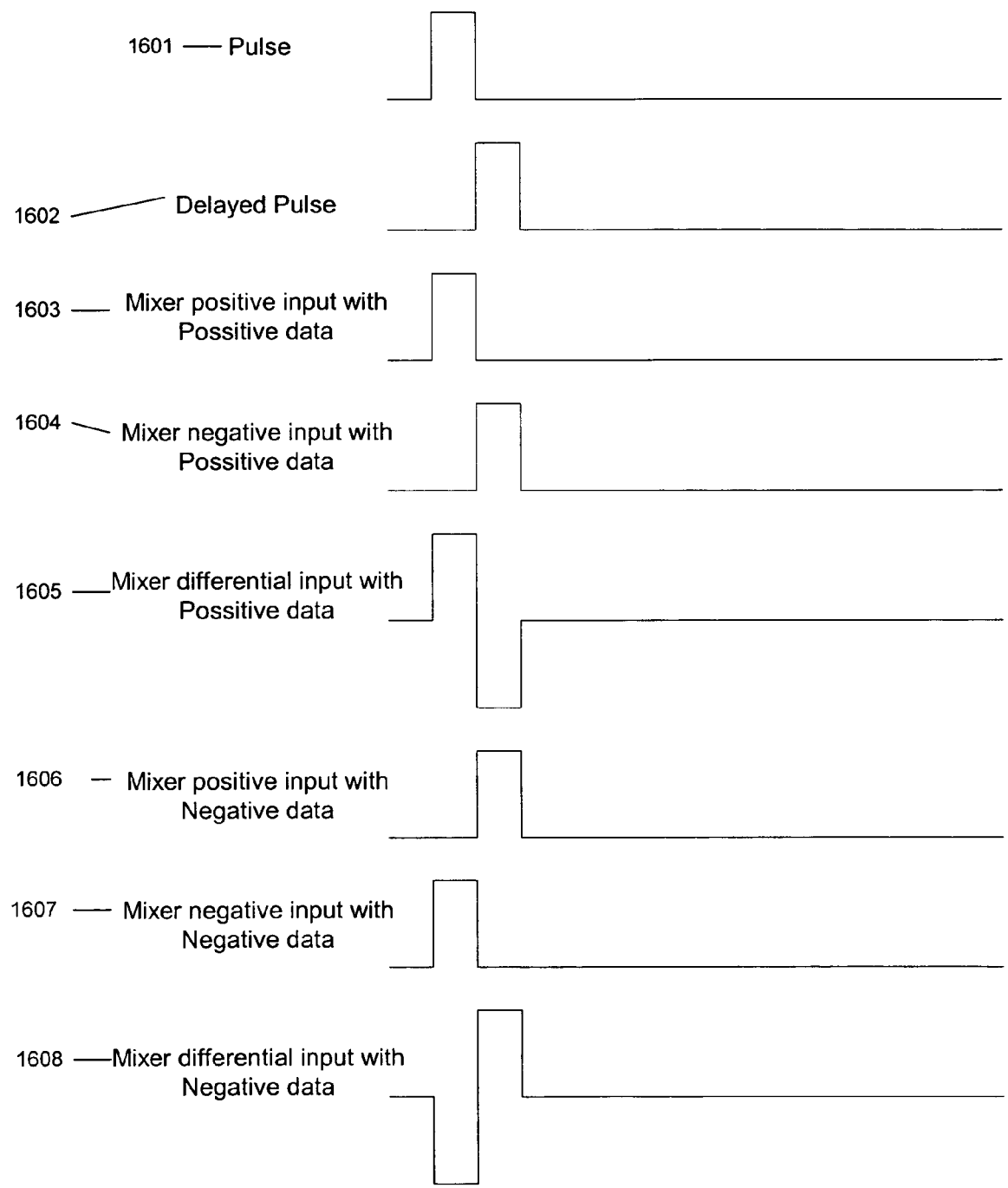
FIG. 16 is a timing diagram illustrating resultant signals associated with the carrierless transmitter illustrated with reference to FIG. 15, according to one embodiment of the invention.

FIG. 15 shows one embodiment of a carrierless transmitter. FIG. 16 shows the resultant signals from various elements of the embodiment in FIG. 15. The base band pulse generator 1501 generates the pulse shape 1601. Both the pulse and a delayed 1502 version of the pulse are sent to a polarity generator 1504. The delayed version of the pulse may be seen in 1602. The polarity generator selects to send the two signals either through the crossed lines or the parallel lines, depending on the input data signal 1503. The two signals are then subtracted using a differential amplifier 1505. The inputs to the amplifier 1505 are either 1603 and 1604; or 1606 and 1607, depending on the data input to the polarity generator 1504. If the inputs are 1603 and 1604 the output of the amplifier is 1605. If the inputs are 1606 and 1607 the output of the amplifier is 1608. The filter 1506 may be used in some embodiments to select certain frequency ranges on which the signal will be sent.

Figure 17:
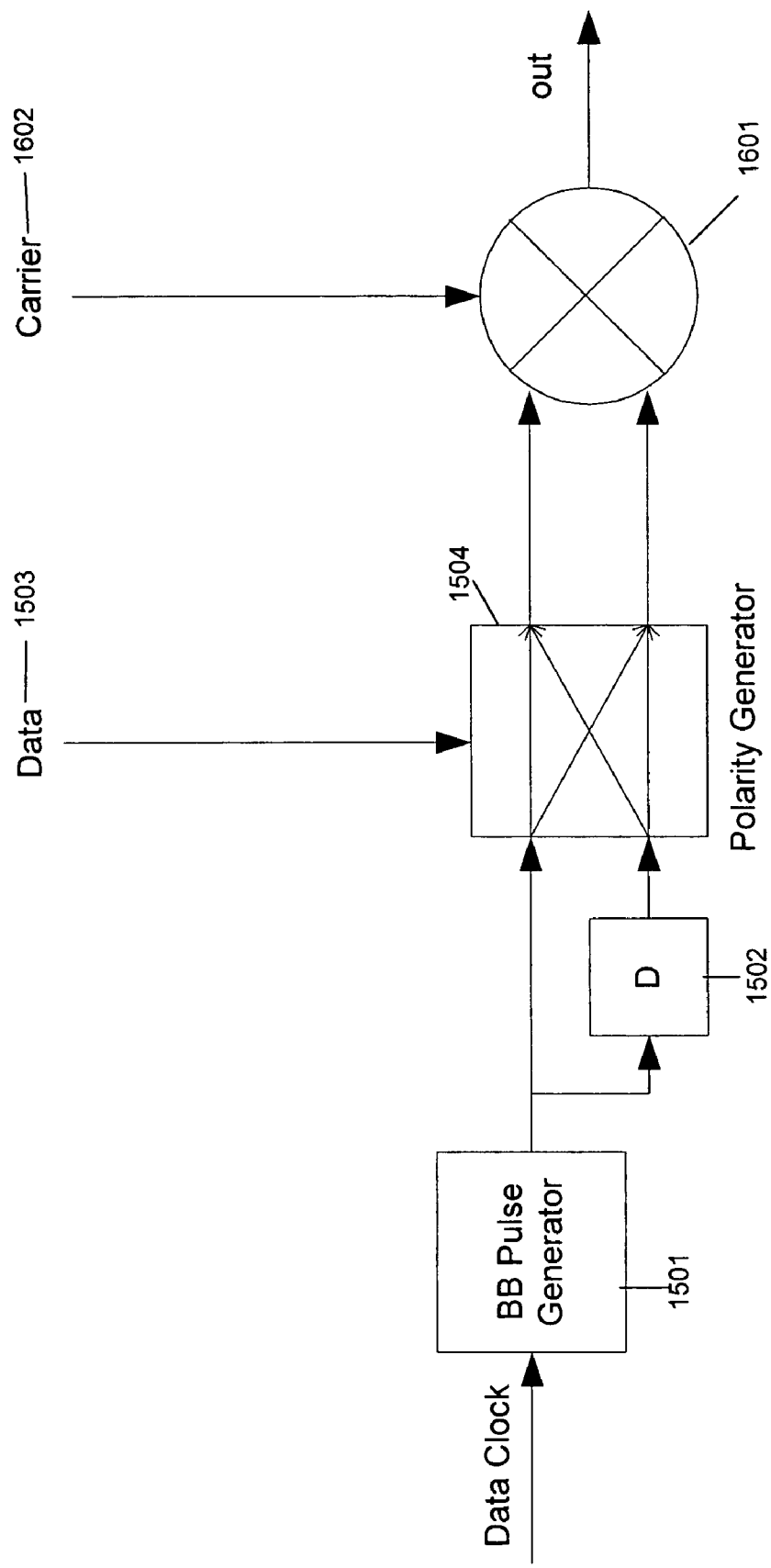
FIG. 17 is a circuit diagram illustrating a pulse generating transmitter, according to one embodiment of the invention.

FIG. 17 depicts one embodiment of the pulse generating transmitter when transmission is accomplished using a carrier signal. The pulse generation is similar to the embodiment shown in FIG. 15, where a pulse generator sends a pulse and a delayed pulse to a polarity generator. In the embodiment in FIG. 17, rather than subtracting the pulses using a differential amplifier, a differential mixer is used. The outputs of the polarity generator 1504 are sent to the inputs of a differential mixer 1601 where they are subtracted. The second input of the differential mixer is a carrier signal 1602, which multiplies the result of the subtraction to produce the output.

Figure 18:
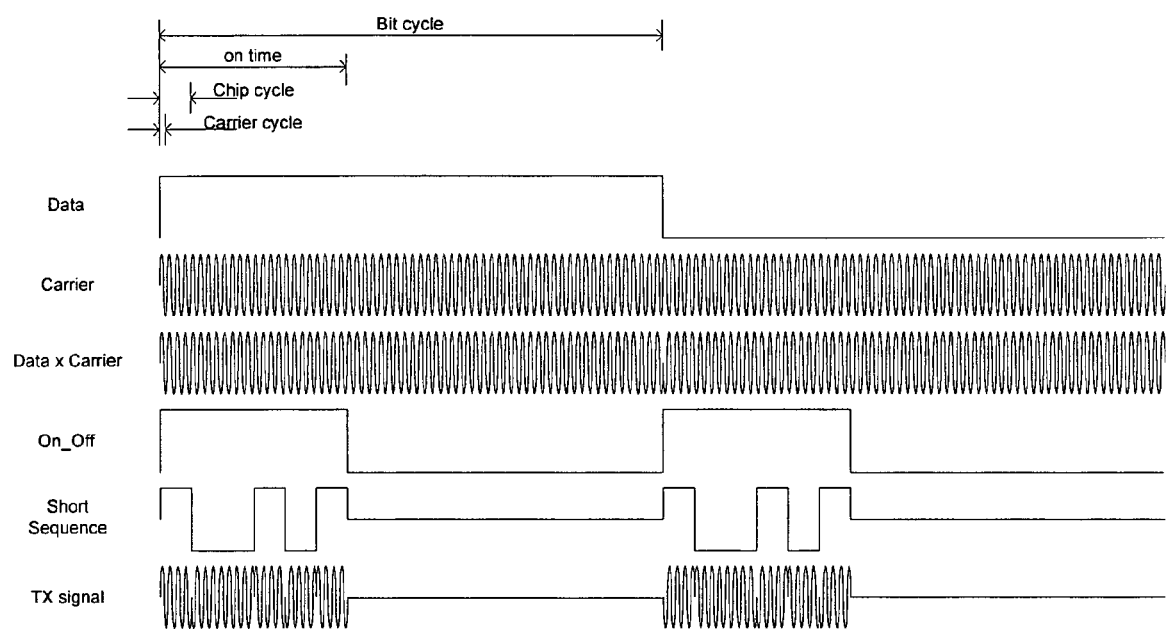
FIG. 18 is a timing diagram illustrating resultant signals at different stages of various ternary modulation schemes, according to one embodiment of the invention.

FIG. 18 shows the resultant signals at different stages of various ternary modulation schemes, including the one depicted in FIG. 17.

Figure 19:
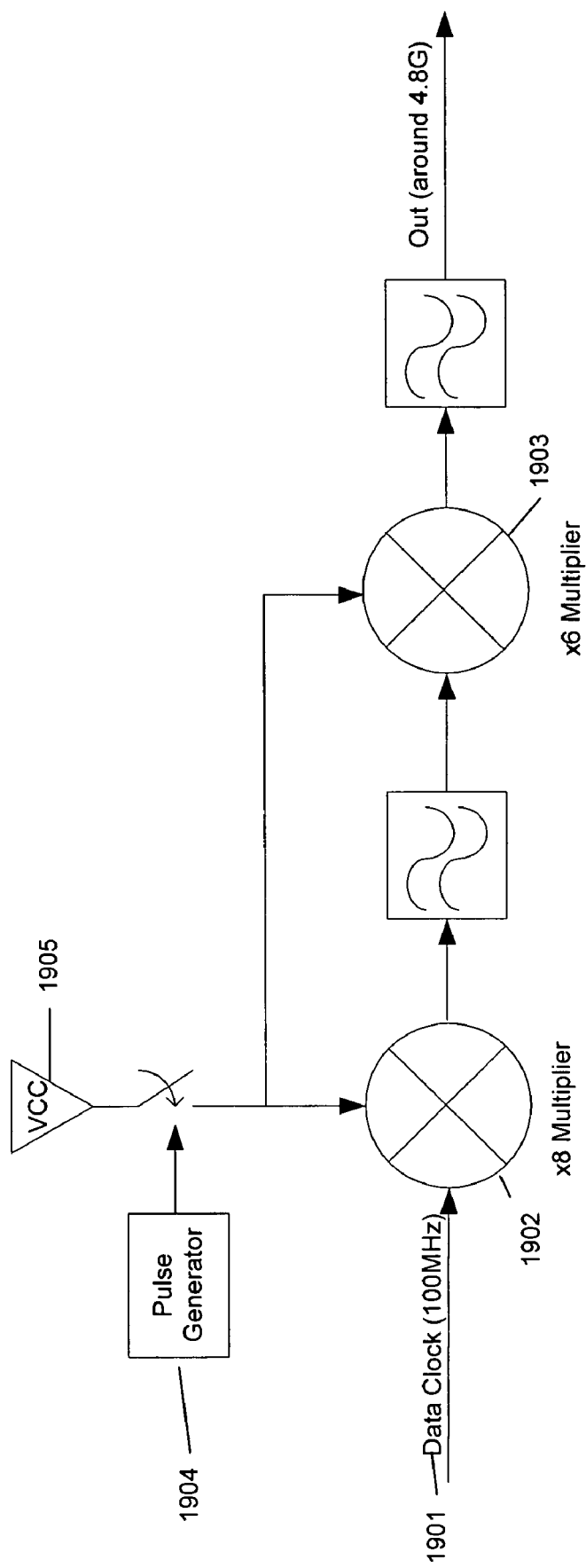
FIG. 19 is a circuit diagram relating to a technique for increasing the frequency of a data clock.

FIG. 19 depicts one embodiment of a way to increase the frequency of a data clock. In this embodiment a lower frequency data clock is multiplied first by a 8× multiplier 1902 and then by a 6× multiplier, which increases the frequency of the clock signal from 100 MHz to around 4.8 GHz. The pulses are modulated onto the carrier using a pulse generator 1904 and a switch 1905. A UWB signal can be generated by switching the multiplier voltage on and off.

What is claimed is:

1. A method for transmitting information using ultra-wide band transmission, the method comprising:
   allocating, for signal transmission, each of a plurality of frequency sub-bands; sending an ultra-wide band transmission comprising the information by transmitting a burst symbol cycle signal over each of the plurality of frequency sub-bands; switching off power to at least one circuit during OFF periods of a transmission to decrease power consumption; and maintaining signal frequency and phase from an end of an ON period to a beginning of the following ON period.

2. The method of claim 1, comprising sending at least two of the burst symbol cycle signals serially.

3. The method of claim 1, comprising utilizing at least one of an analog wave generator, digital wave generator, and a combination analog and digital wave generator.

4. A method for transmitting information using ultra-wide band transmission, the method comprising: allocating, for signal transmission, each of a plurality of frequency sub-bands; and sending an ultra-wide band transmission comprising the information by transmitting a signal over each of the plurality of frequency sub-bands; wherein phase continuity is maintained by: dividing each of the frequency sub-bands into a plurality of segments; and cycling transmission between segments of each of the sub-bands; wherein the method comprises: switching off power to at least one circuit during OFF periods of a transmission to decrease power consumption; and maintaining signal frequency and phase from an end of an ON period to a beginning of the following ON period.

5. A method for transmitting information using ultra-wide band transmission, the method comprising: allocating, for signal transmission, each of a plurality of frequency sub-bands; and sending an ultra-wide band transmission comprising the information by transmitting a signal over each of the plurality of frequency sub-bands, comprising producing at least one analog carrier wave of a frequency sub-band using outputs from a plurality of digital to analog converters; wherein the method comprises: switching off power to at least one circuit during OFF periods of a transmission to decrease power consumption; and maintaining signal frequency and phase from an end of an ON period to a beginning of the following ON period.

6. The method of claim 5, wherein producing the at least one analog carrier wave comprises each of the digital to analog converters outputting a portion of the analog carrier wave based on an input bit, and comprises cycling through input values to produce consecutive segments of the analog carrier wave.

7. A method for transmitting information using ultra-wide band transmission, the method comprising: allocating, for signal transmission, each of a plurality of frequency sub-bands; and sending an ultra-wide band transmission comprising the information by transmitting a signal over each of the plurality of frequency sub-bands, comprising using a sine wave envelope to reduce side lobes in at least one carrier frequency, comprising multiplying a carrier signal by a sine wave of a lower frequency than the carrier frequency.

8. The method of claim 7, comprising varying pulse bandwidth while pulse repetition frequency remains constant, to facilitate control of signal spectrum characteristics and receiver selectivity.

9. The method according to claim 7, wherein the method comprises switching off power to at least one circuit during OFF periods of a transmission to decrease power consumption; and maintaining signal frequency and phase from an end of an ON period to a beginning of the following ON period.

10. The method according to claim 7, wherein the method comprises utilizing a sine wave rectifier having an adjustable threshold.

* * * * *